Dec. 1, 1925. 1,563,905
D. C. KERCKHOFF ET AL
PASTEURIZING PROCESS AND APPARATUS
Filed Nov. 19, 1923 6 Sheets-Sheet 1
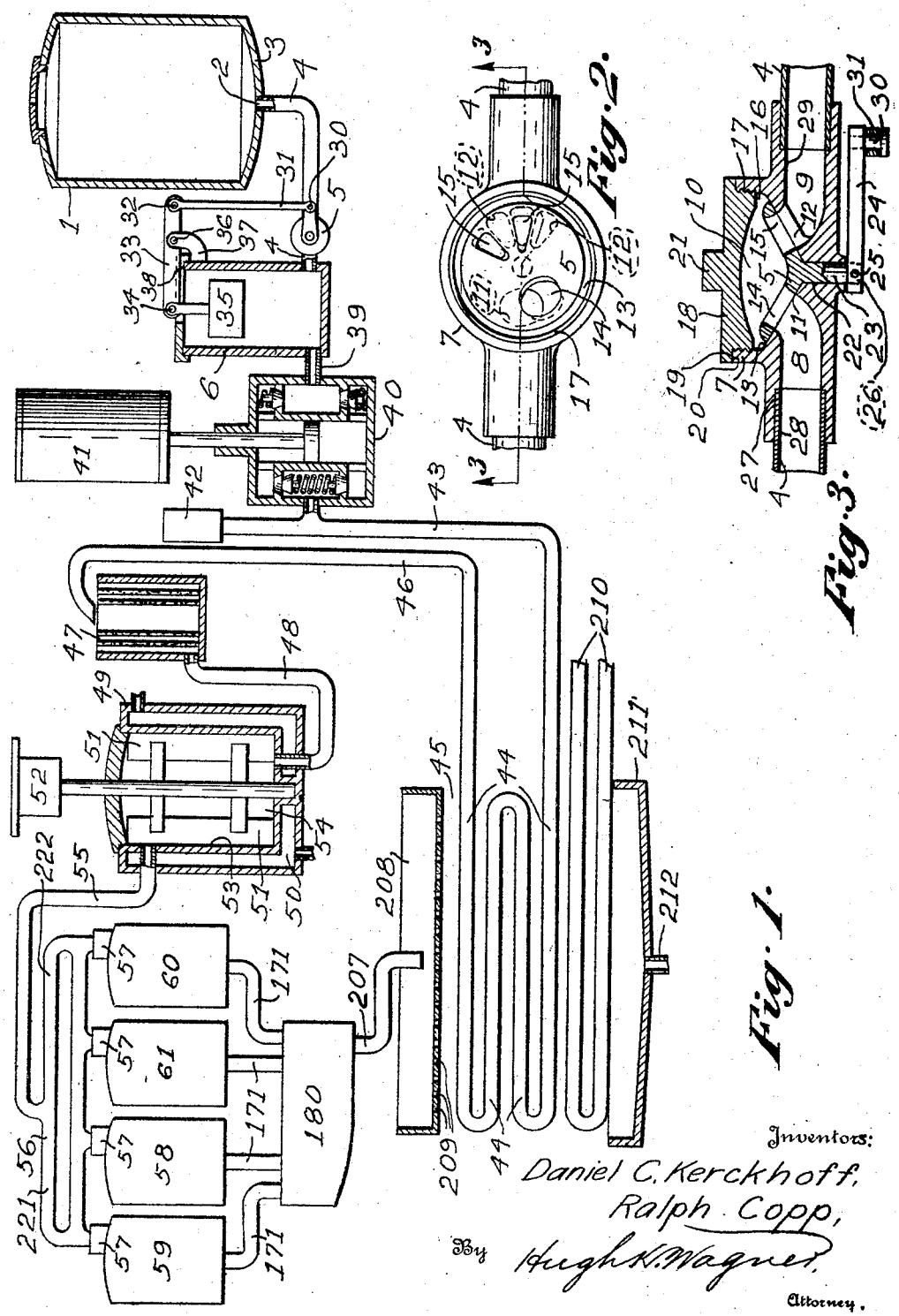
Inventors:
Daniel C. Kerckhoff,
Ralph Copp,
By Hugh K. Wagner
Attorney.

Dec. 1, 1925.

D. C. KERCKHOFF ET AL 1,563,905

PASTEURIZING PROCESS AND APPARATUS

Filed Nov. 19, 1923    6 Sheets-Sheet 2

Inventors:
Daniel C. Kerckhoff,
Ralph Copp.
By Hugh K. Wagner,
Attorney.

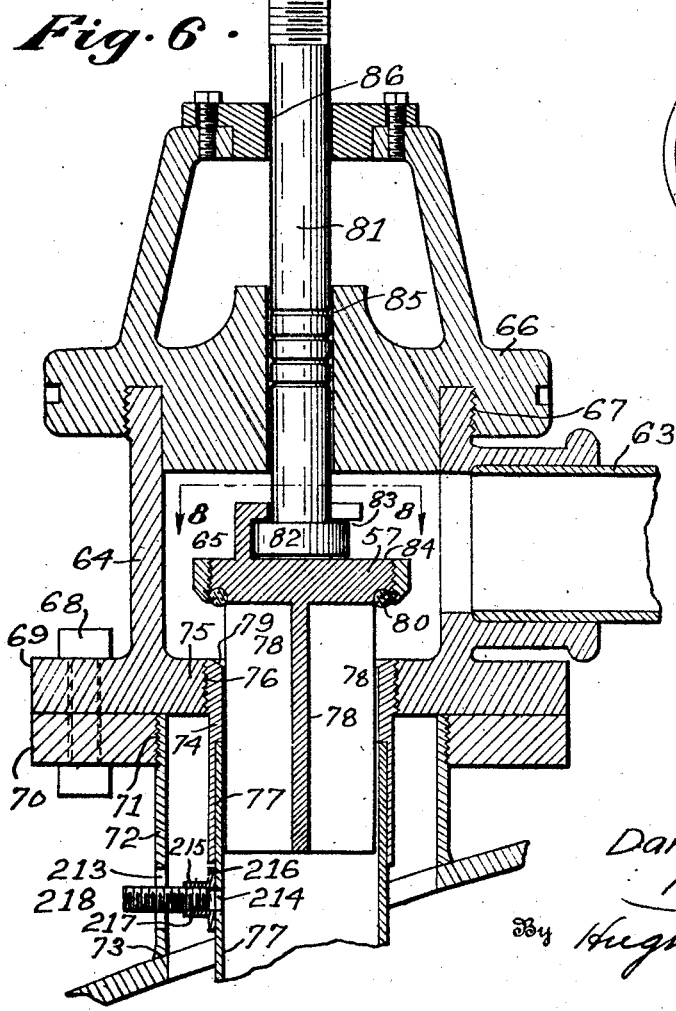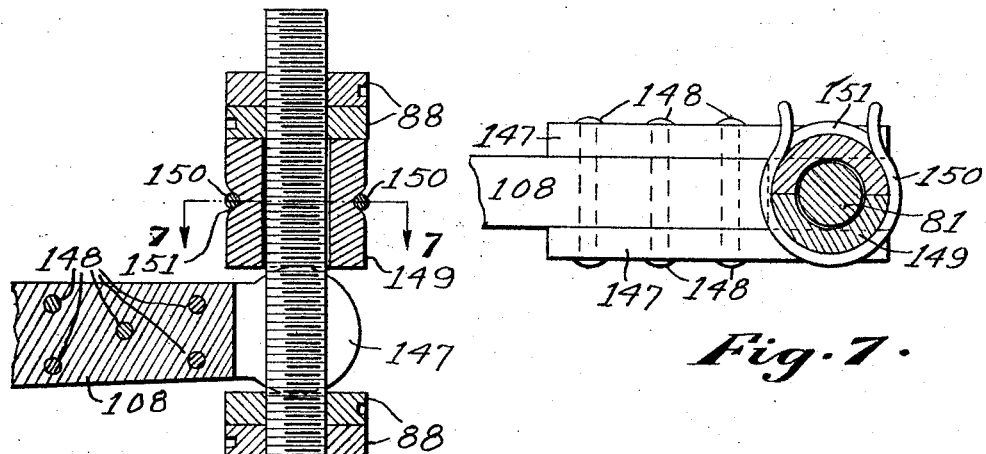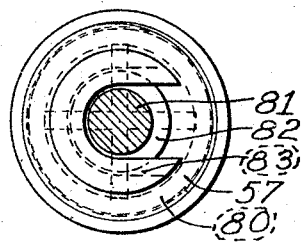

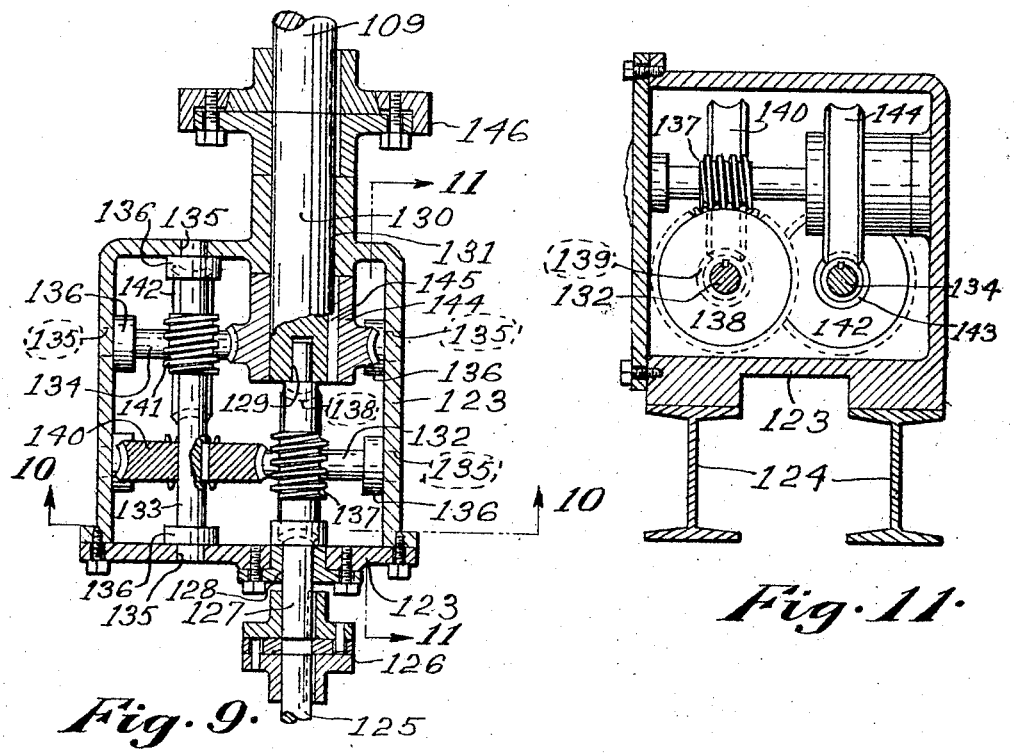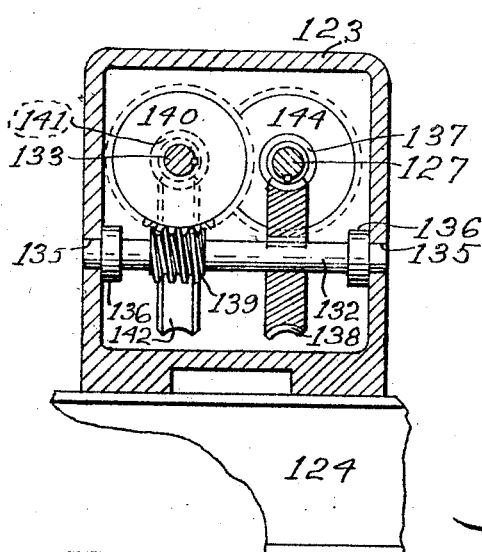

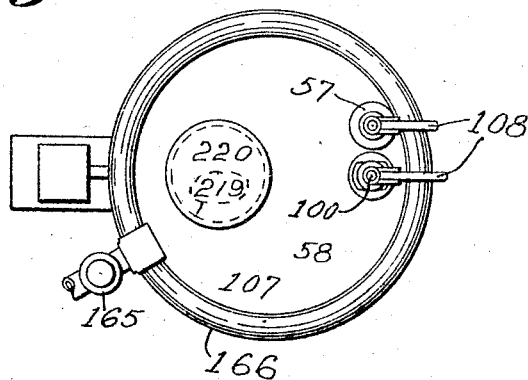
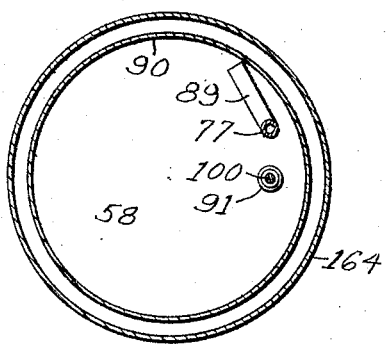
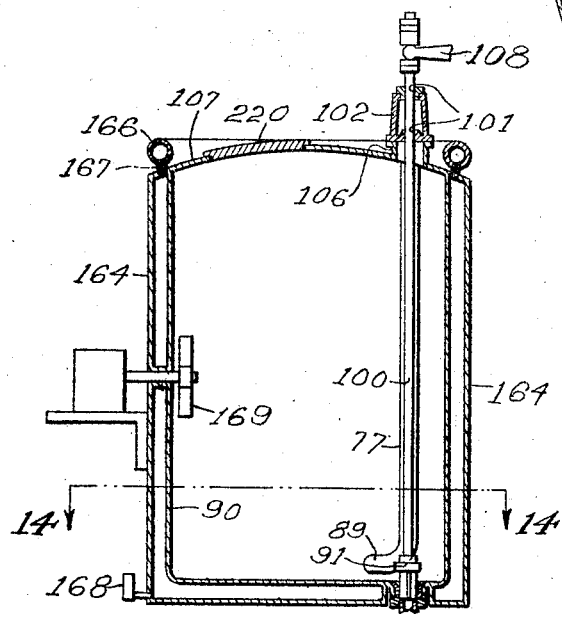

Patented Dec. 1, 1925.

1,563,905

UNITED STATES PATENT OFFICE.

DANIEL C. KERCKHOFF AND RALPH COPP, OF ST. LOUIS, MISSOURI, ASSIGNORS TO PEVELY DAIRY COMPANY, OF ST. LOUIS, MISSOURI, A CORPORATION OF MISSOURI.

PASTEURIZING PROCESS AND APPARATUS.

Application filed November 19, 1923. Serial No. 675,629.

*To all whom it may concern:*

Be it known that we, DANIEL C. KERCKHOFF and RALPH COPP, citizens of the United States, residing at the city of St. Louis, in the State of Missouri, have invented certain new and useful Improvements in Pasteurizing Processes and Apparatus, of which the following is a specification.

This invention has to do with the art of pasteurization, and relates more specifically to a process and apparatus for pasteurizing milk and the like.

In carrying out the conventional commercial process of pasteurizing milk, the milk is pumped from a storage tank through a regenerative cooler or heat exchanger (where it receives a preliminary heating while simultaneously cooling the hot milk discharged from the pasteurizing apparatus) to a filter, and in turn through a heater to be raised to the pasteurizing temperature, and thence into a holding tank in which the milk is retained at the pasteurizing temperature for the necessary length of time, and finally passes therefrom through the regenerative cooler to a receiver.

An object of the present invention is to provide automatic means whereby the entire contents of a holding tank are positively retained therein for the requisite period of time to insure thorough pasteurization.

Another object is to provide automatic means to insure that the proper quantity of milk is supplied to a holding tank at every filling.

Another object is to prevent underheating, overheating, or scorching of the milk by securing an uninterrupted and substantially constant flow of milk through the heater. This object is attained by supplying a number of holding tanks in rotation, one tank beginning to fill automatically as soon as the supply to another tank has been cut off, so that the flow of milk from the heater continues without interruption.

Another object is to provide a constant flow of raw milk through the regenerative cooler.

Another object is to provide a constant flow of pasteurized milk through the regenerative cooler.

Another object consists in the provision of means to observe conveniently any leakage which may exist in the various valves.

Another object consists in providing readily accessible means to adjust manually the holding-tank inlet and outlet valves.

Another object is to facilitate disengagement of the holding tank valves from the automatic mechanism which operates them, so that the said valves may then be operated manually, as may be desired, for instance, in certain emergencies.

Another object is to prevent undue agitation of the milk when passing the same into the various tanks or containers.

Another object is to provide a novel system of piping for supplying the milk to the various holders in rotation, and in which there can be no cessation of flow at any part thereof, thereby preventing deterioration of milk by stagnation.

Another object is to provide a sanitary type of valve, which is held to its seat at all times by the pressure of the milk therein.

Other objects and advantages will be apparent as the description proceeds.

While the invention includes the combined instrumentalities above mentioned, it is to be understood that the aforesaid means are considered to be not only combinatively novel, but in so far as is known, certain of the devices going to make up such means are new in less combinations than the whole, and some capable of individual use, as will more clearly appear hereinafter.

In the accompanying drawings forming part of this specification, in which like numbers of reference denote like parts whenever they occur, Figure 1 is a diagrammatic view of the pasteurization system;

Figure 2 is an elevational view of the sanitary and self-seating type of valve hereinbefore referred to, taken looking from the cap side, the cap being removed and the valve in closed position;

Figure 3 is a longitudinal central sectional view taken on the line 3—3 of Figure 2, and showing the valve entirely open;

Figure 6 is a longitudinal central sectional enlargement view of the holder inlet valve and associated parts;

Figure 7 is a transverse sectional view taken on the line 7—7 of Figure 6;

Figure 8 is a transverse sectional view taken on the line 8—8 of Figure 6;

Figure 9 is a horizontal longitudinal sectional view through the reduction gearing;

Figure 10 is a transverse sectional view of the same taken on the line 10—10 of Figure 9;

Figure 11 is a vertical longitudinal sectional view of the gearing taken on the line 11—11 of Figure 9;

Figure 12 is a plan view of a holder;

Figure 13 is a vertical sectional view of the same; and

Figure 14 is a transverse sectional view on the line 14—14 of Figure 13.

Figure 4:
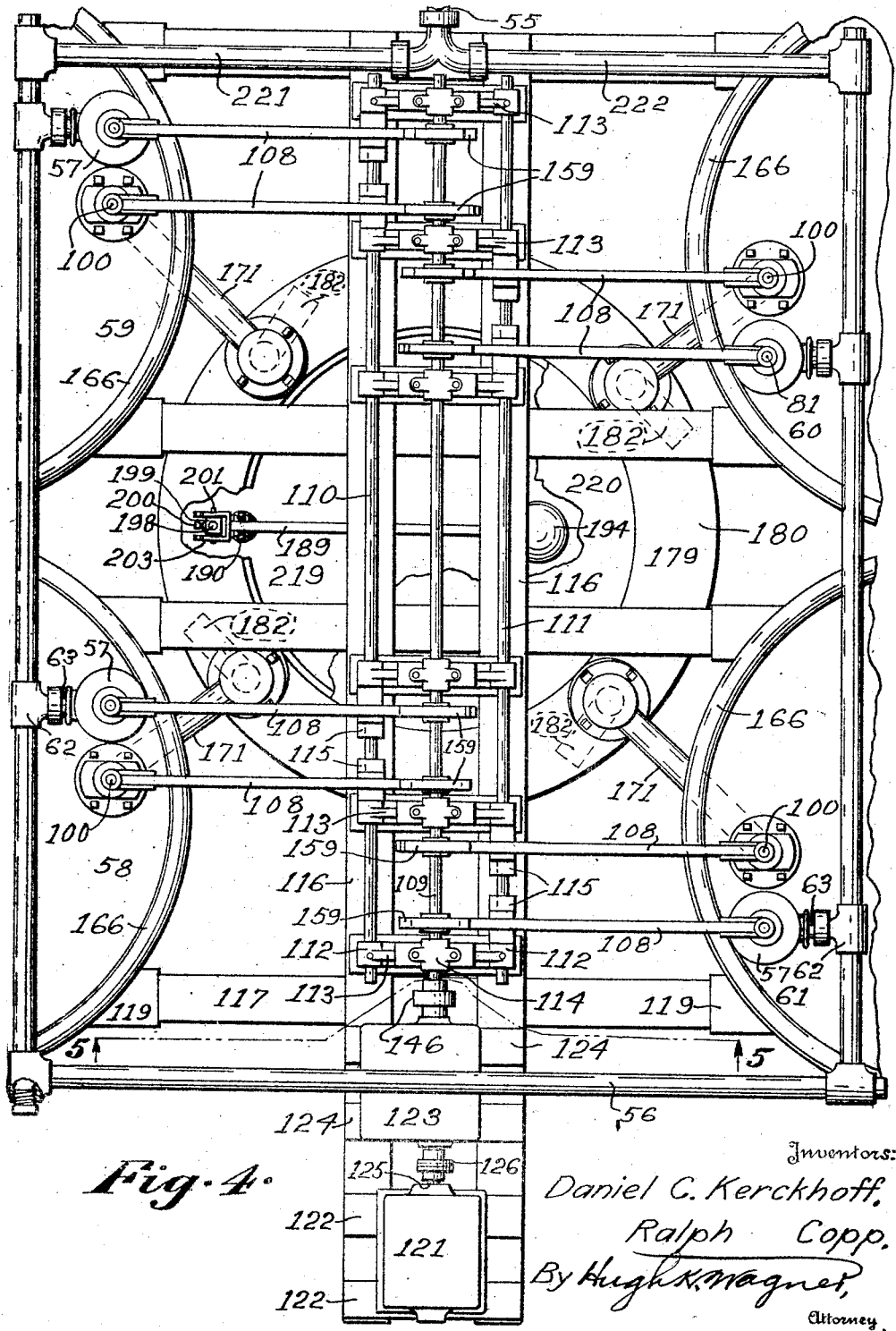
Figure 4 is a plan view showing the drop tank and the holder tanks and the automatic mechanism for operating the holder-tank valves.
Figure 5:
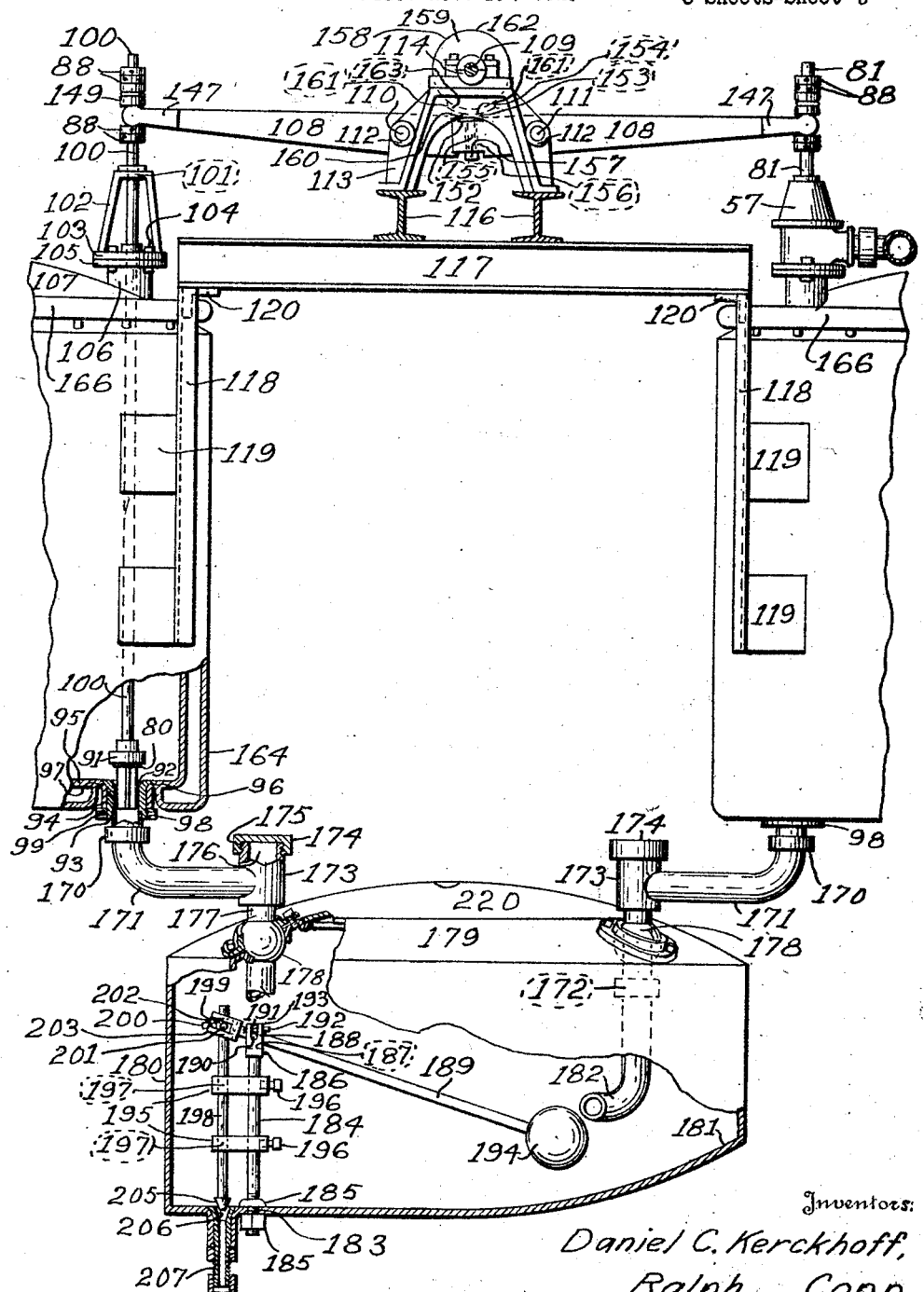
Figure 5 is an elevational view of the same, with a section taken on the line 5—5 of Figure 4, and various other parts being shown in section.

A storage tank 1 for containing the supply of raw milk (see Figure 1) has an opening 2 in its bottom 3, from which opening 2 a pipe 4 leads to a valve 5, which valve controls the flow of milk through said pipe 4 into equalizing tank 6.

A valve housing 7 (Figures 2 and 3) for valve 5 contains inlet and outlet passages 8 and 9, respectively, which passages communicate with valve chamber 10 through openings 11 and 12 respectively in valve seat 13. Valve 5 has openings 14 and 15, which register with openings 11 and 12, respectively, when the valve is fully open. Valve chamber 10 is provided with an opening 16, which is internally threaded at 17 for the reception of an externally threaded plug or cap 18, which cap is screwed down until its annular shoulder 19 abuts against annular face 20 of housing 7. A square projection 21 on the outer side of plug 18 constitutes a means for engagement with a wrench. Valve seat 13 is preferably conical in shape, and communicates at its apex with a central bearing 22, which extends through housing 7, and contains stem 23, preferably formed integral at its inner terminus with valve 5, and having a lever 24 secured by a pin 25 to its outer projecting end 26. The area of inlet opening 11, and the combined area of the two outlet openings 12, are each equal to the area of cross-section of the passages 8 and 9 respectively, thus affording a non-constricted passage for the free flow of milk therethrough when the valve is entirely open. This flow of milk over all parts of the valve, in conjunction with the movement of the valve on its seat, renders the valve practically self-cleaning. The pressure of the milk also keeps the valve 5 against its seat, and this pressure is always present whenever the pipe 4 is full of milk, because the opening 11 is never entirely closed, but is half-way open even when the valve 5 has rotated sufficiently to entirely close the pair of openings 12.

Passages 8 and 9 are enlarged at their outer ends to receive the pipe 4, which is secured therein by soldering at the enlargements 27. The inside surface 28 of pipe 4 can, therefore, be, and is, an uninterrupted and smooth continuation of the inside surfaces 29 of the passages 8 and 9. This manner of attaching pipes to fittings is used throughout the system because it affords no pockets or crevices where milk may stagnate and where bacteria can multiply unduly.

Lever 24 is pivoted at 30 to link 31, which link is pivoted at 32 to lever 33, which lever is pivoted at 34 to float 35 and, also, at 36 to bracket 37 on tank 6. When tank 6 is empty, float 35 descends until lever 33 strikes against edge 38 on tank 6, in which position valve 5 is wide open. When milk passes from tank 1 through pipe 4 into tank 6, valve 5 remains fully open until the milk rises high enough in tank 6 to raise float 35, which thereby operates valve 5 through the intermediacy of lever 33, link 31 and lever 24 to reduce the flow through pipe 4. A substantially constant head of milk is thus assured in the tank 6.

A pipe 39 leads from tank 6 into pump 40, which pump may be driven by any suitable motor or engine 41, and has associated therewith the usual air chamber 42 for equalizing the flow therefrom. The substantially constant head of milk in tank 6 tends to a practically constant flow of milk from the pump 40, irrespective of any variation of head in supply tank 1.

A pipe 43 leads from pump 40 to the tubes 44 in regenerative cooler or heat exchanger 45, and from thence a pipe 46 leads to filter 47. In its passage through the tubes 44 the milk becomes heated to approximately 120°, or sufficiently to allow the butter fat and other essential constituents thereof to pass through the filter 47.

From the filter 47 the purified milk passes through pipe 48 into heater 49. Heater 49 is heated by hot water having a temperature of approximately 170 degrees Fahrenheit and which circulates through the heater jacket 50. Heater 49 contains rapidly revolving paddles 51, which are driven by a motor 52 and which cause the milk to rise by centrifugal force along the interior side 53 of milk chamber 54, from whence it rises through pipe 55 to holder-tank-distributing pipe-circuit 56. In its passage through heater 49 the milk is heated to a pasteurizing temperature, preferably to 142 degrees Fahrenheit.

Pipe circuit 56 supplies inlet valves 57, of pasteurizing holders 58, 59, 60, and 61, respectively, through T's 62 and nipples 63. These valves proper are contained within housings 64, each having an inlet chamber 65, communicating at one side with a nipple 63 and closed at its upper end by a block 66, secured thereto by screw threads 67, as shown in Figure 6. Housing 64 is secured by bolts 68 through its flange 69 to a flange 70, threaded at 71 to neck 72 welded integral with its holder at 73. A sleeve 74 is secured centrally from the bottom 75 of housing 64 by threads 76, and has secured thereto, preferably by soldering, the depending inlet tube 77. Valves 57 are kept within proper bounds by their depending guides 78, extending within the sleeve 74. Sleeve 74 has a seat 79 for a rubber ring 80 of the said valve 57. A rod 81 has a head 82, which fits loosely in a socket 83 on the rear side 84 of the valve 57. Rod 81 passes through bearings 85 and 86 in block 66, so fitting therein as to prevent leakage and yet allow free sliding movement therein. Annular grooves 87 become filled during operation with butter fat, which simultaneously seals and lubricates bearing 85. The upper end of rods 81 are threaded for the reception of nuts 88. The tubes 77 extend nearly to the bottom of their respective holders 58, 59, 60, and 61, and then bend at 89 to a substantially horizontal position and at a slight angle to the inside surface 90 of the holder, so as to discharge the incoming milk at substantially a tangent against the said inside surface. This manner of filling the holder from the bottom and at a tangent is not attended with undue splashing and foaming, such as occurs when discharging into the tank vertically from the top. Such a comparatively smooth filling of the tank is desirable because violent agitation in the presence of air augments the bacteria content of the milk.

Outlet valves 91 are located in the bottom of their respective holders 58, 59, 60, and 61. These valves are exact duplicates of the inlet valves 57, and have their rubber rings 80 adapted to seat against a seat 92 in a sleeve 93 within a neck 94, which neck forms an integral continuation of the inner linings 95 of the several holders. The external conical surface 96 of sleeve 93 is drawn leaktight against the internal conical surface 97 of neck 94 by means of a nut 98, which nut 98 engages threads 99 on the projecting end of the sleeve 93. Valves 91 are operated by rods 100, similar to rods 81 in all respects except length, and connected to valves 91 in the same manner in which rods 81 are connected to valves 57. Rods 100 extend from the valves 91 at the bottom of the respective holders up through the tank and pass through bearings 101 in a block 102 having a flange 103 secured by bolts 104 to a flange 105 on a neck 106 integral with the top wall 107 of a holder.

Valves 57 and 91 are operated by levers 108 arranged in sets disposed on opposite sides, respectively, of a drive shaft 109 arranged between two rows of holders, one set of levers operating the valves of holders 58 and 59, and the other set the valves of holders 60 and 61. One such set of levers is pivoted on a stationary shaft 110 and another set on a stationary shaft 111, both shafts being parallel to the drive shaft 109.

Shafts 110 and 111 are fixed in bosses 112 in standards 113 by set screws or other suitable means, and shaft 109 is journaled in bearings 114 in said standards 113. Collars 115 on the shafts 110 and 111 co-operate with the bosses 112 to locate the levers in proper position along the length of the shafts 110 and 111.

The standards 113 are supported on and suitably fastened to a pair of I-beams 116, arranged parallel to the drive shaft 109. The I-beams 116 are supported on and suitably fastened to I-beams 117, which span the space between the two rows of holders, and are supported by such holders by means of a channel beam 118 secured to blocks 119 fastened to the sides of the several holders, the said channel beam being fastened to the beams 117 through the intermediacy of angle plates 120.

A motor 121 is secured to beams 122 fastened across beams 116 near their forward ends. A housing 123 containing reduction gearing is interposed between the motor 121 and the forward end of drive shaft 109. The said housing is secured through the intermediacy of beams 124 to the beams 116.

Motor shaft 125 is connected by coupling 126 to high-speed shaft 127, which is journaled at bearing 128 in the housing 123 and at 129 in the end of the slow speed shaft 130, which shaft 130 in turn is journaled in bearing 131 in housing 123, the said bearings 131 and 128 being in alinement with one another. This is shown in Figures 9, 10, and 11. Intermediate shafts 132, 133, and 134 are journaled in bearings 135, and secured in place longitudinally by collars 136 fixed to the said several shafts. A worm 137 fixed on high-speed shaft 127 engages wormwheel 138 fixed on shaft 132. A worm 139 fixed on shaft 132 engages worm-wheel 140 fixed on shaft 133. A worm 141 fixed on shaft 133 engages worm-wheel 142 fixed on shaft 134. A worm 143 fixed on shaft 134 engages worm-wheel 144 keyed at 145 to slow-speed shaft 130. Slow-speed shaft 130 is connected through the intermediacy of the adjustable coupling 146 to the drive shaft 109. Drive shaft 109 rotates once an hour, the reduction gearing just described constituting a compact means for utilizing the high speed power of a conventional motor to drive the slow-speed shaft 109.

Hardened steel arms 147 are secured by means of rivets 148 to the outer ends of the levers 108 on either side thereof, so as to straddle the respective rods 81 and 100 of the valves 57 or 91 which they are intended to operate. The motion of the levers 108 is transmitted to the rods 81 and 100 through the nuts 88 and sleeve 149. The nuts 88 afford means for adjusting the position of the valves 57 or 91 relatively to the positions of the levers 108. Sleeve 149 is split to form two halves, which are held together by a spring 150 in an annular groove 151 in the said halves. When it is desired to close any of the valves, irrespective of the particular positions of their respective levers 108, as may become necessary in certain emergencies or for other reasons, it is not necessary to disturb the nuts 88, but the valves may be disconnected from the levers 108, so as to close independently, by simply detaching the spring 150 from groove 151, when the two halves of the sleeve 149 may be easily removed from between the upper nuts 88 and the arms 147 of levers 108.

The inner ends of levers 108 have transverse grooves or depressions 152 in their top sides, in which fit shoes 153, having concave top faces 154. The shoes 153 are provided with stems 155, which extend through holes 156 in levers 108 and are threaded at their free ends to receive nuts 157, which are tightened thereon to hold the shoes 153 securely in place in the grooves 152. The concave faces 154 of shoes 153 fit the contour 158 of cams 159, which cams are fixed to the shaft 109. Faces 154 are beveled at their front and rear edges 169, so that the shoes 153 may ride smoothly up or down the inclines 161 of cam periphery 158. When shoes 153 ride over the depressed portion 162 of cam periphery 158, the valves actuated by such cams are closed, and, when the shoes ride on the elevated part 163 of the periphery 158, the said valves are open. All of the cams 159 are similar in size and shape, and have the relative lengths of their elevated and depressed peripheral portions 163 and 162, respectively, so proportioned that each valve remains open 45 minutes and closed 15 minutes of every hour, or for each revolution of the shaft 109. The angular relation between the several cams about the shaft 109 is such that the four inlet valves of the several holders are opened in succession, one valve opening while another is closing, but only one valve at a time being open, while the other three remain closed. The same condition obtains for governing the operation of the outlet valves. For each holder, the cam controlling its outlet valve is advanced ninety degrees ahead of the cam controlling its inlet valve, so that for fifteen minutes, or a quarter of a revolution of the shaft 109, the outlet valve is open to empty the holder, while the inlet valve remains closed; and for the next fifteen minutes, the outlet valve is closed, while the inlet valve is open to refill the holder. During the next thirty minutes, or remainder of the hour, both valves remain closed, and the milk in the holder is undergoing pasteurization. The actual time of pasteurization, however, averages forty-three minutes, because pasteurization also takes place while filling and emptying the holder; fifteen minutes being required for filling, and approximately eleven minutes for emptying, or an average of $$\frac{15+11}{2}$$

or thirteen minutes being thereby added to the thirty minutes during which both valves remain closed.

The usual jacket 164 surrounds the side and bottom of the several holders 58, 59, 60, and 61. Preparatory to starting the apparatus, steam is admitted to the jacket 164 through valve 165 and distributing pipe 166 and branches 167, any air or water in the holders being released through valve 168. This steam, as is understood by those skilled in the art, heats the jacket and sterilizes the holder, and when the steam condenses, the jacket becomes highly evacuated, and thereby acts as an efficient insulator for the holder to retain the heat within the milk subsequently admitted thereto for pasteurization.

The usual agitator 169 is employed for gently stirring the milk to maintain its homogeneity throughout the holder.

A union 170 connects sleeve 93 with pipe bend 171, which bend in turn is connected by union 172 to T fitting 173. A removable cap 174, secured by threads 175 to the top opening of T fitting 173, permits inspection of its interior 176 for the purpose of detecting any leakage that may exist in the outlet valve 91. A pipe 177 leads from the lower opening of T fitting 173 through a universal joint 178, on the top 179 of drop tank 180, to the bottom 181 of said tank, where it bends at 182 to discharge the milk at a tangent to the side of the tank, in substantially the same manner and for the same purpose as that of the tubes 77 of the holders. There are, of course, a number of such pipes 177, there being one leading from each holder, and their bends 182 preferably all discharge in the same general peripheral direction to mitigate agitation of the milk.

Drop tank 180 has an opening 183 in its bottom 181, through which opening passes a post 184, threaded at its lower end for the reception of nuts 185, which secure said post to the bottom of said tank. The upper end of post 184 terminates in a block 186, bifurcated at 187 to form two upwardly projecting branches 188, between which passes a lever 189, having a pin 190 fixed transversely therethrough, and which pin has its opposite ends pivoted in slots 191 in the branches 188. Pins 192 in the subbranches 193 of branches 188 close the upper ends of the slots 191 and prevent dislocation of the pin 190. This construction facilitates removal of lever 189 and its float 194 for purposes of cleaning, inspection, or repairs. Arms or brackets 195 extend from post 184, to which they are secured by set screws 196. The brackets 195 have bearings 197, through which rod 198 is adapted to reciprocate. A block 199 is slidable on rod 198, and can be fixed at any definite height by tightening its set screw 200 against rod 198. This manner of adjustment is a means of regulating the size of the valve opening 206. Block 199 has projecting pins 201 at opposite sides thereof, which pins fit slidably in slots 202 in arms 203 of a bifurcated block 204, which block is secured to lever 189 at the end opposite to float 194, and which arms 203 straddle the block 199. The lower end of rod 198 terminates in valve plug 205, co-operating with seat 206 in sleeve 207, which sleeve is secured to tank 180 in a manner similar to that in which the sleeves 93 are secured to the bottom of the several holders 58, 59, 60, and 61. As the milk rises in tank 180, float 194 rises with it, tilting lever 189, and thereby depressing rod 198 and tending to close valve 205. The taper of valve plug 205 is such that any tendency to augment the flow of milk through the valve orifice 206 because of increased head is exactly compensated for by the reduction in the size of the orifice 206, accomplished by the operation of the float and valve mechanism. The purpose of drop tank 180, with its associated valve mechanism, is to provide a constant flow of pasteurized milk for the regenerative cooler 45.

The milk passes from valve 205 through pipe 207 to trough 208 in cooler 45, from whence it descends through the orifices 209, in the bottom of trough 208, and trickles over the pipes 44, where it parts with part of its heat to the raw milk passing through the pipes 44, and then finally flows over the ammonia expansion pipes 210 into the bottom trough 211, from whence it passes through pipe 212 into any suitable receiver at a final temperature of approximately 40 degrees Fahrenheit.

For the purpose of observing any leakage through the valves 57, neck 72 and tube 77 are provided with openings 213 and 214, respectively. A sleeve 215 is secured by its flange 216 to tube 77 so as to register with opening 214, and is threaded internally at 217 for the reception of a plug 218, which plug extends through the opening 213. Plug 218 normally closes opening 214, and is removed when it is desired to view the interior of tube 77 to determine the presence of a leak.

Holders 58, 59, 60, and 61, drop tank 180, and storage tank 1 have openings 219 in their tops, which are closed by covers 220. The covers are not air-tight, but permit the entrance of air when the respective tanks are being emptied.

The mode of operation of this apparatus will now be briefly described.

Raw milk flows from tank 1 through pipe 4 into equalizer tank 6, the constant head of milk therein causing an even flow of milk through pipe 39 into pump 40, which pumps the milk at an even flow, by virtue of the constant head in tank 6, into pipe 43 and thence through tubes 44 of heat exchanger 45, where the hot pasteurized milk flowing over the outside of these tubes heats the raw milk therein to a temperature of approximately 120 degrees Fahrenheit. From tubes 44 the milk passes through pipe 46 to filter 47, where it is separated from any foreign matter, and then passes through heater 49, which heats the milk to a pasteurizing temperature of preferably 142 degrees Fahrenheit and also forces it by centrifugal force through the pipe 55 to pipe-circuit 56, from whence it is distributed to the several pasteurizing holders 58, 59, 60, and 61 in succession, as determined by the action of the cams 159 and their associated mechanism for operating the inlet valves 57 and outlet valves 91.

In this connection it is to be noted that not all of the several inlet valves 57 are ever closed at any time, so that a continuous and uninterrupted flow of milk is maintained through the heater 49, thereby preventing scorching and uneven heating.

It is to be further noted that there can be no cessation of flow anywhere in the pipe-circuit 56, no matter which particular inlet valve happens to be open, because there are no dead ends, the flow dividing between the branches 221 and 222 and approaching the open inlet valve from both directions. This makes for low bacteria content.

It is also manifest that, by reason of the positively timed valve operating mechanism, and the non-leaking character of the valves themselves (because of the rubber ring 80), the retention of the milk in the holders for the full time necessary to attain thorough pasteurization is assured.

This positive timing of the valves, in conjunction with the steady, even flow of milk from the pump 40, by virtue of the constant head in tank 6, insures that the proper quantity of milk is supplied to the holders at every filling of the same.

The steady flow from the pump also means a steady, even flow of raw milk through the regenerative cooler, and if the flow of hot milk from the pasteurizer holders is constant, the exchange of heat from the hot milk to the raw milk will also be a constant factor, contributing to prevent uneven heating or scorching in the heater 49.

From the holders 58, 59, 60, and 61 the pasteurized milk passes into drop tank 180, from whence a steady, even flow, attained by the float and valve mechanism therein, passes through the pipe 207 to regenerative cooler 45, this steady flow contributing to the desirable results set forth in the preceding paragraph.

As a result of this exchange of heat, the pasteurized milk is now at a temperature of approximately fifty-five degrees Fahrenheit, and is further cooled down to forty degrees Fahrenheit by any suitable means, and then is passed into a suitable receiver.

Having thus described this invention, we hereby reserve the benefit of all changes in form, arrangement, order, or use of parts, as it is evident that many minor changes may be made therein without departing from the spirit of this invention or the scope of the following claims.

We claim:

1. In a pasteurizing apparatus, a holding tank having a discharge opening in its bottom wall portion and an inlet opening and a clearance opening in its top wall portion; respective lift valves for the inlet and discharge openings; an operating stem for the discharge valve projecting through the said clearance opening above the top of the tank; an operating stem for the inlet valve extending upwardly therefrom; and automatic means for reciprocating said stems at respective predetermined time intervals.

2. In a pasteurizing apparatus, a holding tank having inlet and discharge openings, respective lift valves for the said openings and provided with guiding means to insure proper seating, and respective operating stems having heads loosely and removably socketed in the said valves, and means for guiding the said stems.

3. In a pasteurizing apparatus, a holding tank having a discharge opening in the bottom portion of its wall and an inlet opening in the top portion of its wall; respective lift valves for the inlet and discharge openings and provided with means for guiding the same thereto; operating stems non-rigidly connected to the said valves and extending above the top of the said tank; and means for guiding the said stems.

4. A pasteurizing holder comprising a tank having top, bottom, and side walls, the top wall having two openings therein, and the bottom wall having a discharge opening; an inlet valve casing mounted to close one of the two said top wall openings; a valve adapted to close the said discharge opening; a stem for the said discharge valve extending beyond the top wall of the tank; and means closing the other of the said top openings and forming a bearing to guide the said stem.

5. A pasteurizing holder comprising a tank having top, bottom, and side walls, the top wall having a manhole opening and two other openings therein, and the bottom wall having a discharge opening; an inlet valve casing mounted to close one of the two said top wall openings; a valve adapted to close the discharge opening; a stem for the said discharge valve extending upwardly through the other of the two said top wall openings; a bearing for the said stem adapted to close the said other opening; and a cover for the said manhole opening.

6. A pasteurizing holder comprising a tank having top, bottom, and side walls, the top wall having two openings therein, and the bottom wall having a discharge opening; an inlet valve casing mounted to close one of the two said top wall openings; a tube leading from the inlet valve casing and adapted to discharge at the lower portion of the interior of the tank; a valve adapted to close the said discharge opening; a stem for the said valve extending beyond the top wall of the tank; and means closing the other of the said top openings and forming a bearing to guide the said stem.

7. A pasteurizing holder comprising a tank having top, bottom, and side walls, the top wall having a pair of upwardly extending necks and the bottom wall having a depending neck; an inlet valve casing forming a removable cap for one of the said top necks; a discharge valve seat in the depending neck; a valve for the said seat; a cap removably secured to the other of said top necks and including a guide bearing; and an operating stem connected to the said valve and passing through the said guide bearing.

8. The combination with a pasteurizing holder having a pair of exteriorly projecting necks on the top wall thereof, a discharge valve in the bottom thereof, a bearing cap removably secured to one of the said necks, a stem leading from the discharge valve through the bearing in the said cap, an inlet valve casing removably secured to the top of the other neck, a pipe leading from the said casing through the said neck into the holder, a valve adapted to seat in the said casing, the said other neck having a lateral opening and the said pipe having a lateral opening in alinement with the said lateral neck-opening, and a removable plug in the said lateral pipe-opening, whereby any leakage from said inlet valve may be observed upon removing said plug.

9. The combination with a pasteurizing holder having an exteriorly projecting neck, a valve casing forming a removable extension to the said neck and having respective openings at the opposite ends thereof near and remote from the said neck, a valve in the said casing adapted to close the near opening, a removable cap adapted to close the remote opening and including a guide bearing, and an operating stem having a head loosely socketed in a laterally opening recess in the said valve and projecting through the said bearing.

10. The combination with a pasteurizing holder having an exteriorly projecting neck provided at its outer end with a lateral flange, a valve casing having a flange adapted to cooperate with the neck flange and having respective openings at the opposite ends thereof near and remote from the said neck, means adapted to secure the said flanges together, a valve in the said casing adapted to close the near opening, a hollow cap screw-threading on the far end of the said casing and provided with a guide bearing at the end adjacent the said casing and with an opening at the end remote from the said casing, a removable cover for the hollow cap having a guide bearing disposed in alinement with the cap guide bearing, and an operating stem passing through the said bearings and removably and loosely socketed in the said valve.

11. A pasteurizing tank having an outwardly flaring integral neck formed in its wall to provide a passage therethrough which enlarges at its inner end, a bushing having a valve seat and enlarging at its inner end to fit the interior of the said neck, and a lift valve adapted to co-operate with the said valve seat to control the flow of fluid through the said passage.

12. A pasteurizing tank having a portion of its wall flaring outwardly to form an exteriorly extending neck which enlarges toward its inner terminus, a bushing flaring outwardly towards its inner end to fit the said neck and provide a substantially conical seat, a lift valve adapted to co-operate with the said seat, and means for drawing the said bushing outwardly to fit tightly against the said neck.

13. In a pasteurizing apparatus, the combination of a revoluble shaft, a plurality of holders, inlet and outlet lift valves controlling the passage of fluid to and from the said holders, operating stems for the said valves projecting above the tops of the said holders, a plurality of cams on said shaft, one for each valve, and respective levers extending from the said cams to the said valves.

14. In a pasteurizing apparatus, the combination of a revoluble shaft, a plurality of holders, inlet and outlet lift valves controlling the passage of fluid to and from the said holders, operating stems for the said valves projecting above the tops of the said holders, a plurality of cams on said shaft, one for each valve, respective levers extending from the said cams to the said valves, and means for adjusting the position of said stems relatively to the said levers.

15. In a pasteurizing apparatus, the combination of a revoluble shaft, a plurality of holders, inlet and outlet valves controlling the passage of fluid to and from the said holders, operating stems for the said valves having threaded ends projecting above the tops of the said holders, nuts on the said threaded stem ends, a plurality of cams on the said shaft, one for each valve, and respective levers operated by the said cams and engaging the said nuts.

16. In a pasteurizing apparatus, the combination of a revoluble shaft, a plurality of holders, inlet and outlet valves controlling the flow of fluid to and from the said holders, operating stems for the said valves having threaded ends projecting above the tops of the said holders, nuts on the said threaded stem ends, laterally withdrawable sleeves on the stem adjacent the said nuts and respective levers operated by the said cams and engaging the said sleeves.

17. In a pasteurizing apparatus, the combination of a plurality of holders disposed in opposing rows, inlet and outlet valves controlling the flow of liquid to and from the said holders, a pair of header pipes, each one extending along a respective row of holders, a pair of pipes, each one connecting corresponding ends of the header pipes so as to form an endless conduit therewith, a supply pipe connected to one of the said pipes to deliver pasteurizing liquid thereto, branch connections from each header to the respective inlet valves supplied thereby, and automatic means for operating said valves at predetermined time intervals.

18. In a pasteurizing apparatus, the combination of a receiving tank having a discharge outlet, a plurality of holders grouped around the same, inlet and outlet valves controlling the flow of liquid to and from the said holders, a plurality of conduits, each one leading from the outlet valve of a respective holder to the receiving tank, an endless header pipe leading in succession from one inlet pipe to the next, a supply pipe connected to the header pipe for supplying liquid thereto, means controlled by the head of liquid in the receiving tank to maintain an even flow of liquid through the discharge outlet thereof, and automatic means for operating said valves at predetermined time intervals.

In testimony whereof we hereunto affix our signatures.

DANIEL C. KERCKHOFF.
RALPH COPP.